United States Patent [19]

Johnson

[11] Patent Number: 4,524,432
[45] Date of Patent: Jun. 18, 1985

[54] MEASUREMENT OF POROSITY AND FORMATION FACTOR USING SLOW COMPRESSIONAL WAVES

[75] Inventor: David L. Johnson, Danbury, Conn.

[73] Assignee: Schlumberger Technology Corporation, New York, N.Y.

[21] Appl. No.: 331,059

[22] Filed: Dec. 15, 1981

[51] Int. Cl.$^3$ ............................ G01V 1/40; G01V 1/28
[52] U.S. Cl. ........................................ 367/25; 367/34; 73/152
[58] Field of Search ........................ 367/33, 34, 35, 28, 367/25, 29, 38; 181/102, 104, 105; 73/152

[56] References Cited

U.S. PATENT DOCUMENTS

| | | | |
|---|---|---|---|
| 2,669,689 | 2/1954 | Doll | 324/347 |
| 3,542,150 | 11/1970 | Youmans et al. | 181/104 |
| 3,590,228 | 6/1971 | Burke | 367/27 |

OTHER PUBLICATIONS

Dutta, N. C., "Theoritical Analysis of Observed Second Bulk Compressional Wave . . . ," Appl. Phys. Lett. 37(10), 11/15/80.
"Ultrasonic Measurements of Some Mineral Filled Plastics", Lees et al., 5/77, IEEE Transactions on Sonics, pp. 222-225.
Morgan, "Physical Properties of Marine Sediments as Related to Seismic Velocities," 3/69, Geophysics, vol. 34, pp. 529-545.
Dutta et al., "Attenuation and Dispersion of Compressional Waves in Fluid Filled Porous Rocks . . . ", Geophysics, 11/79, vol. 44, pp. 1777-1788.
Plona, "Observation of a Second Bulk . . . ", Appl. Phys. Lett., 2/80, vol. 36.
Brown, "Connection Between Formation Factor . . . and", Geophysics, 8/80, vol. 45, #8.
Sen, "The Dielectric and Conductivity Response of Sedimentary," 9/80, SPE 9379.
Mayer et al., "Determination of Sonic Velocities from . . . ", J. Acoust. Soc. Am., vol. 57, #1, 1/75.
Ibrahim et al., "Seismic Velocities and Electric Resist. . . . ", Geophysics, vol. 46, #10, 10/81.

Primary Examiner—Nelson Moskowitz
Assistant Examiner—Ian J. Lobo
Attorney, Agent, or Firm—David Carroll; Martin Novack

[57] ABSTRACT

By establishing a slow compressional wave in subsurface formations, and then measuring the velocity of the slow compressional wave, one can obtain useful information about the porosity and formation factor of the formations through which the slow compressional wave has passed.

6 Claims, 4 Drawing Figures

MEASUREMENT OF POROSITY AND FORMATION FACTOR USING SLOW COMPRESSIONAL WAVES

BACKGROUND OF THE INVENTION

This invention relates to investigation of subsurface formations surrounding a borehole, and, more particularly, to a borehole logging method and apparatus for determining the porosity and/or formation factor of subsurface formations.

It is generally accepted that the resistivity of a "clean" formation (i.e., one relatively free of clay) is proportional to the resistivity of the fluid with which it is saturated. The constant of proportionality, F, is called the "formation factor" (or, sometimes, the "formation resistivity factor"). Therefore, if a clean formation sample of resistivity $R_o$ is fully saturated with fluid of resistivity $R_w$, we have $$F = \frac{R_o}{R_w}. \quad (1)$$

If formation resistivity is measured and F is known, the fluid resistivity can be obtained from relationship (1).

The porosity, $\phi$, of a formation is the fraction of the total volume occupied by pores or voids. Formation factor is a function of porosity, and also a function of pore structure and pore size distribution. One accepted relationship between porosity and formation factor is $$F = \frac{a}{\phi^m} \quad (2)$$

where a and m can both vary for different types of formations. In a compacted formation, the values sometimes used are a=1 and m=2, that is:

$$F \approx \frac{1}{\phi^2}. \quad (3)$$

There are various relatively reliable well logging techniques for determining the porosity of formations, although additional or alternate source information concerning porosity is always desirable. Regarding determination of formation factor, a certain amount of guesswork is usually involved. Therefore, any inputs which lead to a more accurate value of formation factor are particularly valuable in improving the results of electrical logging.

With regard to sonic logging, it is advantageous to study properties of sonic propagation in various media. It is generally recognized that an important aspect of acoustic attenuation and dispersion in porous fluid-saturated media is due to the relative motion that can occur between the solid and fluid parts thereof. A theory which studies the displacements of the two components was developed in the prior art, and it was proposed that a sonic wave propagation model for fluid-saturated porous media should include, in addition to the expected compressional and shear waves (which are used in conventional sonic logging), a wave called a second bulk or "slow compressional wave" propagating at a velocity which is slower than that of the compressional and shear waves. [See M. A. Biot, "Theory of Propagation of Elastic Waves in a Fluid-Saturated Porous Solid", Journal of Acoustical Society of America, Vol. 28, pages 168-191 (1956)]. The slow compressional wave was recently described for use in well logging. In particular, the copending U.S. patent application Ser. No. 174,396 of T. Plona, now abandoned assigned to the same assignee as the present invention, discloses techniques for applying sonic energy to formations to cause propagation therein of a slow compressional wave, detecting and measuring properties of the slow compressional wave propagating in the formations, and determining the permeability of the formations from the measured properties.

It is an object of the present invention to utilize certain measurements of the slow compressional wave in determining properties of porosity and/or formation factor of formations through which the slow compressional wave has propagated.

SUMMARY OF THE INVENTION

Applicant has discovered that by establishing a slow compressional wave in the formations, and then measuring the velocity of the slow compressional wave, one can obtain useful information about the porosity and formation factor of the formations through which the slow compressional wave has passed. In particular, the velocity of the slow compressional wave, $V_{slow}$, is in general related to the velocity of sound in the fluid constituent of the formations being logged, $V_f$, and the fluid/solid coupling coefficient, $\alpha$. In the usual case, in which the fluid is much more compressible than the solid frame of the matrix, $V_{slow}$ can be represented substantially in accordance with the following relationship:

$$V_{slow} = \frac{V_f}{\sqrt{\alpha}} \quad (4)$$

Solving for $\alpha$, gives:

$$\alpha = \frac{V_f^2}{V_{slow}^2}. \quad (5)$$

It is known that $\alpha$ is related to the formation factor, F, and the porosity, $\phi$, of the formations, in accordance with the relationship:

$$\alpha = F\phi. \quad (6)$$

Substituting from relationship (5, yields $$F\phi = \frac{V_f^2}{V_{slow}^2} \quad (7)$$

or $$F = \frac{V_f^2}{\phi V_{slow}^2} \quad (8)$$

Also, if F is approximated, such as in accordance with relationship (3), as $$F \approx \frac{1}{\phi^2}, \quad (3)$$

then, from relationship (7), porosity can be expressed as $$\phi \approx \frac{V_{slow}^2}{V_f^2} \quad (9)$$

The velocity of sound in the fluid, $V_f$, is generally known. (Even if the nature of the fluid is not known—and it may be largely determined in the invaded zone—the velocity of sound in the fluid does not vary to a great extent for different fluids.) Accordingly, when $V_{slow}$ is measured, one can obtain the product of porosity and formation factor from relationship (7), or can obtain porosity from relationship (9). If porosity is determined by other means, formation factor can be obtained from relationship (8).

In accordance with the form of the invention, there is generated a processed recording, for example a trace, which is a function of the porosity of formations surrounding a borehole. Slow compressional wave energy is established in the formations. Wave energy that has passed through the formations is received at a plurality of spaced locations, and recordings are formed of the received wave energy at said spaced locations for a series of different formation depth levels in the borehole. The recordings are then converted, at said series of depth levels, into a recording of the velocity of the wave energy at said series of depth levels. This processed velocity recording is a function of the porosity of the formation over said series of depth levels. As noted above, the processed velocity can also be used to obtain an indication of porosity or of the product of porosity and formation factor. Also, if measurements of porosity are derived from another source (such as a neutron-density log), the derived porosity and the processed velocity can be used to obtain an indication of formation factor, F.

Applicant notes that compressional and shear wave velocities measured in conventional sonic logging are insensitive to the fluid-solid coupling coefficient, $\alpha$. $V_{slow}$ is measured herein to obtain $\alpha$ or other parameters that relate to $\alpha$. It is also noted that $V_{slow}$ is always less than $V_f$.

Further features and advantages of the invention will become more readily apparent from the following detailed description when taken in conjunction with the accompanying drawings.

DESCRIPTION OF THE PREFERRED EMBODIMENT

Figure 1:
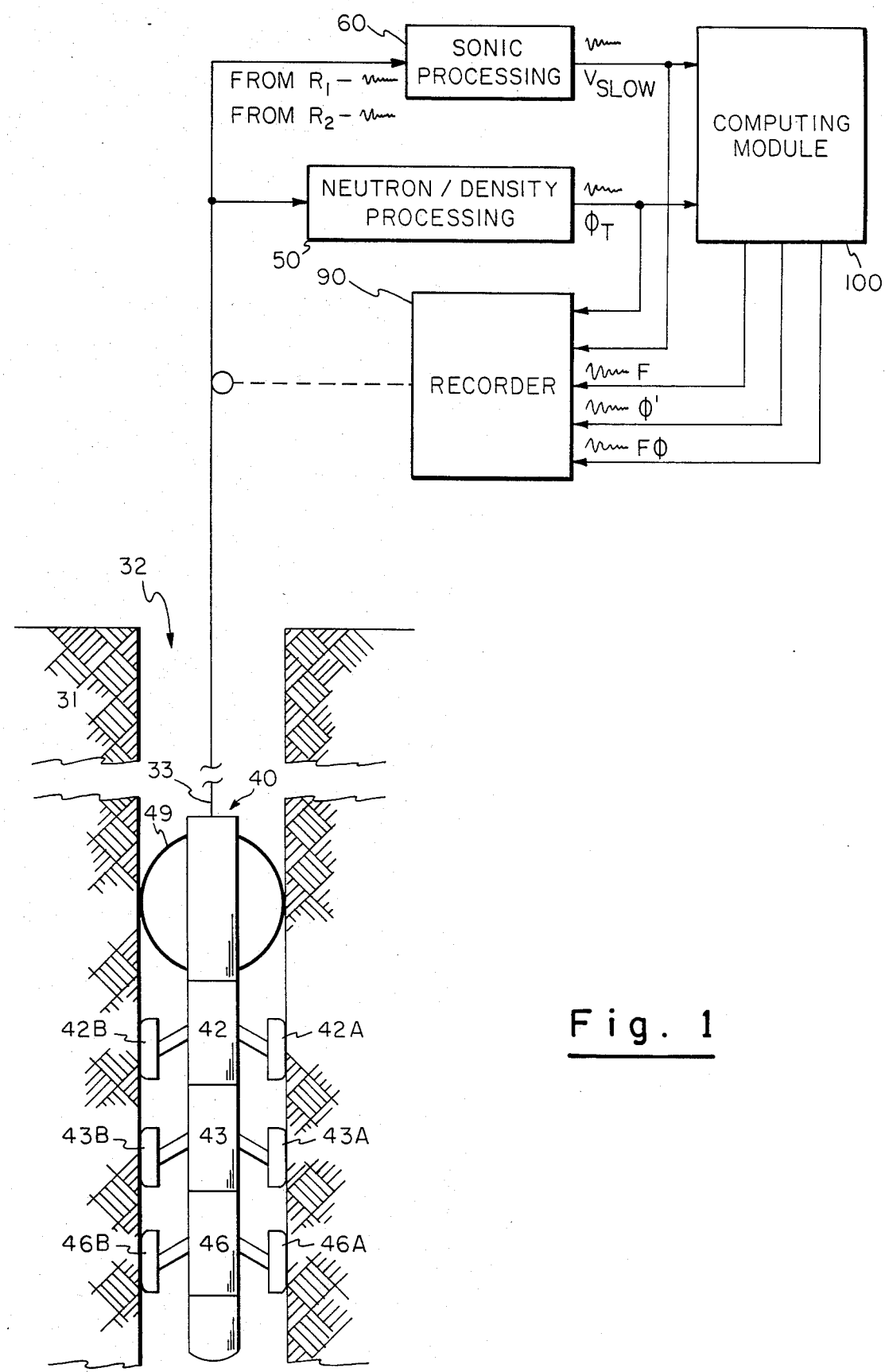
FIG. 1 is a block diagram of an apparatus in accordance with the invention, and which can be used to practice the method of the invention.

Referring to FIG. 1, there is shown a representative embodiment of an apparatus for investigating properties of subsurface earth formations in accordance with the present invention and which can be used to practice the method of the invention. A borehole 32, traversing formations 31, is typically filled with a drilling fluid or mud which contains finely divided solids in suspension. The investigating apparatus or logging device 40 is suspended in the borehole on an armored cable 33, the length of which substantially determines the relative depth of the device 40. The cable length is controlled by means at the surface, such as a drum and winch mechanism (not shown). A suitable generator (not shown) may conventionally provide power uphole and/or downhole. Processing circuitry is illustrated as being uphole at the surface, although portions thereof may be located downhole.

The investigating apparatus 40 includes a sidewall epithermal neutron exploring device 42 having a source and detector mounted on a skid 42A. A device of this type is disclosed, for example, in U.S. Pat. No. 2,769,918. Each count registered in the epithermal neutron detector is received by processing circuitry (represented as a portion of circuitry 50 in FIG. 1) which includes a function former that operates in known manner to produce a signal $\phi_N$ which represents the formation porosity as determined by the neutron logging device. The investigating apparatus 40 further includes a formation density exploring device 43 for producing well logging measurements which can be utilized to calculate bulk density of the adjoining formations, in known manner. In this regard, a skid 43A houses a source and detectors spaced different distances from the source. This arrangement of source and detectors produces signals that correspond to the bulk density of the earth formations as is described, for example, in the U.S. Pat. No. 3,321,625. Processing circuitry (again represented as part of circuitry 50) includes circuits which conventionally convert the signals derived from short and long spacing detectors to a computed bulk density. The resulting bulk density is applied to a porosity computing circuit (again, within circuitry 50) which computes the porosity as derived from the bulk density, in known fashion. The derived porosity, typically designated $\phi_D$, can then be combined with $\phi_N$ to obtain an indication of formation total porosity, designated $\phi_T$, and which is indicated as an output of the circuitry 50. The signal $\phi_T$ is recorded, as a function of borehole depth, on recorder 90. It will be understood that the recorder 90, in the present embodiment, is intended to represent generally all suitable types of recording of the signals input thereto, including the generation of visually readable traces of the signals as well as the storage of analog or digital electrical representations thereof. The signals to be recorded may also be transmitted for recording at a remote location.

The downhole investigating apparatus 40 further includes sonic logging device 46 having at least one transmitter and a plurality of receivers mounted in a pad 46A. (To keep the investigating apparatus 40 centered in the borehole, and the wall-engaging devices urged against the borehole wall, extendable wall-engaging members 42B, 43B and 46B may be provided opposite the members 42A, 43A and 46A. For centering the upper portions of the investigating apparatus, centralizers 49 may also be provided). The sonic logging signals from this device are coupled to sonic processing circuitry 60.

Figure 2:
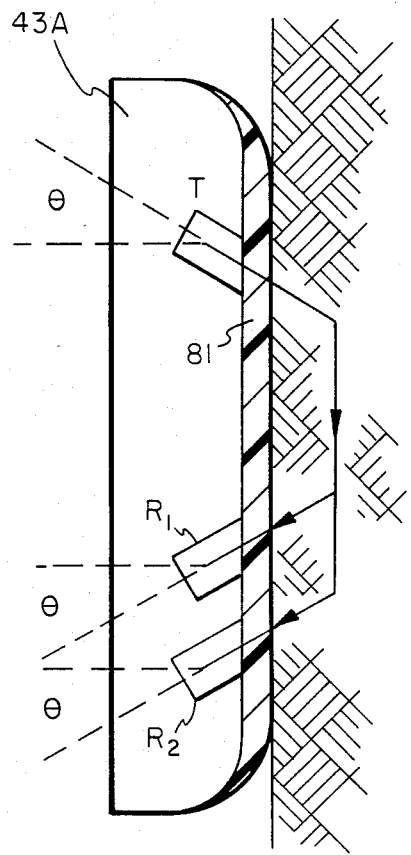
FIG. 2 illustrates in further detail the sonic logging pad of FIG. 1.

Referring to FIG. 2, a cross-section of the pad 46A is shown in engagement with the borehole wall. A sonic generating transmitter T, such as a piezoelectric transducer, is shown mounted in the face of the pad with a shield or layer of transmitting medium 81 being interposed between the transducer and the borehole wall.

The transducer may be energized by the previously mentioned energy source (not shown).

The transmitting medium 81 is chosen such that the ratio of the sonic speed in the transmitting medium 81 to the sonic speed of the headwave in the formation, approximately 1 km/sec, is less than unity, so as to yield a real valued incident angle of excitation. A suitable material for the transmitting medium is, for example, a tungsten-vinyl composite material having a sonic velocity of 0.82 km/sec at 40 volume percent of tungsten. Other suitable materials may be employed so long as the above relationship between the sonic speed in the formations and in the material is satisfied.

Transmitter T is electrically pulsed to yield an acoustic output having a narrow band of frequencies in the range of about 20 KHz to 5 MHz. Acoustic energy is transmitted from the transmitter into the formations, and a portion thereof reenters the borehole, as depicted by the arrowheaded lines in FIG. 2, where it is detected by receivers $R_1$ and $R_2$ which develop electrical signals corresponding to intensity variations of the received acoustic energy. Owing to the existence of the transmitting medium 81, the acoustic waves received by receivers $R_1$ and $R_2$ will include a component due to the propagation of a slow compressional wave in the formations. As defined herein, a slow compressional wave is second bulk or compressional wave which accompanies, and has a slower propagation than, the primary bulk or compressional wave.

In order to enhance the transmission and pickup of a slow compressional wave the transmitter and receivers may be oriented, within the pad, relative to the borehole wall so as to respectively launch and receive acoustic waves substantially along an angle relative to normal planes N which intersect a longitudinal axis of the pad device 27, as shown in FIG. 2. The angle $\theta$, which lies between zero and ninety degrees, preferably satisfies the following relationship relating to acoustic velocity:

$$\theta = \text{Sin}^{-1}\left[\frac{\text{velocity in the transmitting medium}}{\text{velocity of the headwave in the formation}}\right]$$

Further description of the establishment and detection of the slow compressional wave can be found in the above-referenced U.S. application Ser. No. 174,396 of T. Plona.

The signals obtained at receivers $R_1$ and $R_2$ may be transmitted to the surface of the earth in analog form or, more conventionally, be sampled and digitized downhole and then transmitted to the surface of the earth. The signal waveforms received from the receivers $R_1$ and $R_2$ (and, typically, additional receivers, if provided) can be used to obtain the velocity of the slow compressional wave. For example, a correlation technique can be used to determine the desired velocity by correlating the signals obtained at the different receivers to obtain a velocity value which optimally accounts for the difference in arrival times of the signals at the different receiver locations. In general, most correlation techniques are based on the assumption that substantially the same signal waveform will arrive at the different receiver locations at different times, the delay as between receiver locations that are successively further from the transmitter depending on the distance between receivers and the velocity of propagation of the wave energy in the formations opposing the receiver locations. Thus, a correlation technique can be employed to compare a delayed version of a signal arriving at a closer receiver location with a signal arriving at a more remote receiver location, the amount of delay (for a given known distance as between the receivers) depending on an assumed "trial" value of velocity of the acoustic wave energy as between the receiver locations in question. In simplified terms, the correlation technique involves trying various trial velocity values and determining which one provides the best "match". For a more detailed description, reference can be made to the U.S. Pat. No. 4,210,966.

Figure 3:
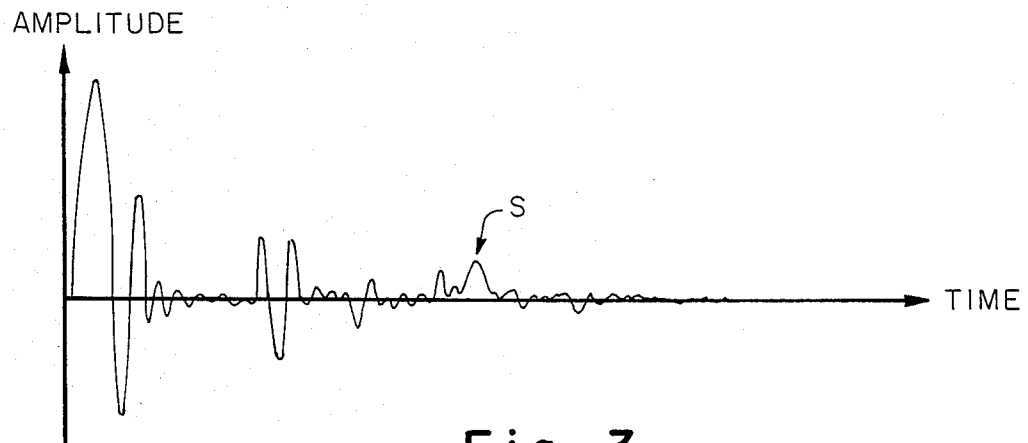
FIG. 3 illustrates the typical expected acoustic receiver waveform.

FIG. 3 illustrates, at arrival peak s of a receiver waveform, the slow compressional arrival as described in the above-referenced copending U.S. patent application of T. Plona. In the present invention the correlation or other velocity-determining technique, as represented by block 60, is adapted to detect this arrival and determine the velocity of the slow compressional wave $V_{slow}$. Accordingly, a recording or trace of $V_{slow}$, as a function of depth level, is output from block 60, as shown in FIG. 1, and coupled to recorder 90 and computing module 100.

As described above, applicant has discovered that the velocity of the slow compressional wave, $V_{slow}$, is related to the velocity of sound in the fluid constituent of the formations being logged, $V_f$, and the fluid/solid coupling coefficient, $\alpha$, substantially in accordance with the relationship $$V_{slow} = \frac{V_f}{\sqrt{\alpha}} \tag{4}$$

Solving for $\alpha$, gives:

$$\alpha = \frac{V_f^2}{V_{slow}^2} \tag{5}$$

It is known that $\alpha$ is related to the formation factor, F, and the porosity, $\phi$, of the formations, in accordance with the relationship:

$$\alpha = F\phi \tag{6}$$

Substituting from relationship (5), yields $$F\phi = \frac{V_f^2}{V_{slow}^2} \tag{7}$$

or $$F = \frac{V_f^2}{\phi V_{slow}^2}. \tag{8}$$

Also, if F is approximated, such as in accordance with relationship (3) as $$F \approx \frac{1}{\phi^2}, \tag{3}$$

then, from relationship (7), porosity can be expressed as $$\phi \approx \frac{V_{slow}^2}{V_f^2} \quad (9)$$

The velocity of sound in the fluid, $V_f$, is generally known. (Even if the nature of the fluid is not known—and it may be largely determined in the invaded zone—the velocity of sound in the fluid does not vary to a great extent for different fluids.) Accordingly, when $V_{slow}$ is measured, one can obtain the product of porosity and formation factor from relationship (7), or can obtain porosity from relationship (9). If porosity is determined by other means, formation factor can be obtained from relationship (8).

Figure 4:
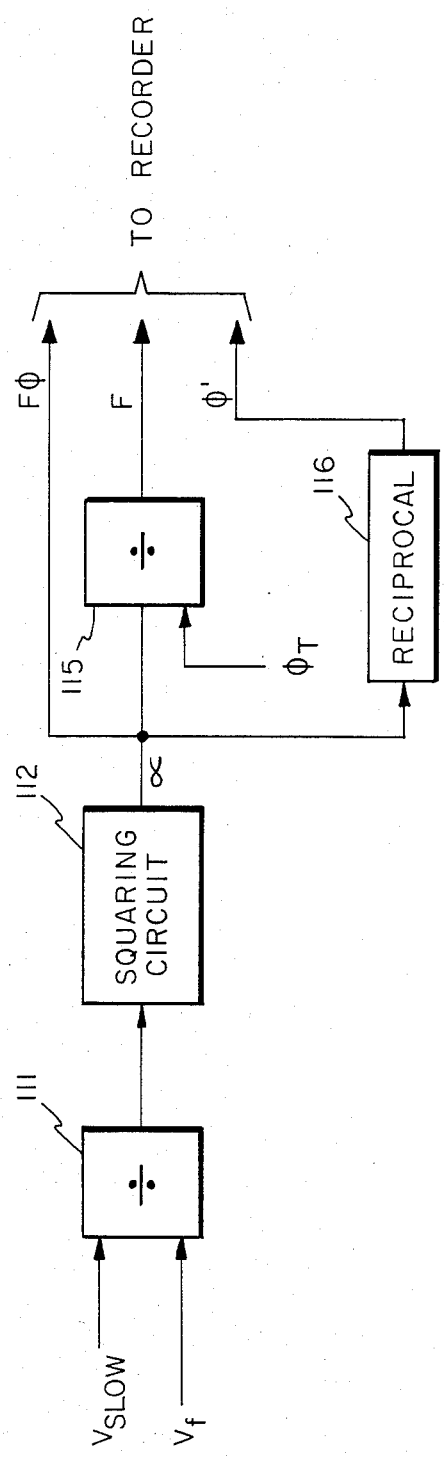
FIG. 4 is a block diagram of the computing module 100 of FIG. 1.

The computing moudle 100 receives $V_{slow}$ and $\phi_T$ and generates outputs for recording by recorder 90. The computer module 100 may be implemented by a properly programmed general purpose processor or computer, or by special purpose circuitry, as represented in FIG. 4. A signal level representative of $V_f$ and a signal representative of $V_{slow}$ (from block 60 of FIG. 1), are coupled to a divider circuit 111. The output of divider circuit 111 is coupled to a squaring circuit 112. The squaring circuit 112 produces a signal representative of $\alpha$ in accordance with relationship (5). Also, in accordance with relationship (7), this output is indicative of the product of porosity and formation factor. The output of squaring circuit 112 is coupled to another dividing circuit 115, the other input of which receives the signal $\phi_T$ (from processing circuit 50 of FIG. 1). In accordance with relationship (8), the output of dividing circuit 115 provides an indication of the formation factor F of the formations being logged. The output of squaring circuit 112 is also coupled to reciprocal circuit 116 whose output provides a further indication of porosity designated $\phi$, in accordance with relationship (9).

The invention has been described with reference to a particular embodiment, but variations within the spirit and scope of the invention will occur to those skilled in the art. For example, it will be understood that the porosity information obtained from the neutron/density logs in the illustrated embodiment could readily be derived from a separate logging run or from other sources.

I claim:

1. A method for determining the porosity of subsurface formations, comprising the steps of:
   establishing a slow compressional wave in the formations;
   measuring the velocity of the slow compressional wave that has passed through the formations; and
   determining the porosity of said formations from said measured velocity, said porosity being determined as proportional to the square of said measured velocity.

2. A method for determining the formation factor of subsurface formations, comprising the steps of:
   deriving a measure of the porosity of the formations;
   establishing a slow compressional wave in the formations;
   measuring the velocity of the slow compressional wave that has passed through the formations; and
   determining the formation factor of said formations from said velocity and said porosity, said formation factor being determined as proportional to the inverse of the product of said porosity and the square of said measured velocity.

3. A method for determining the product of porosity and formation factor of subsurface formations, comprising the steps of:
   establishing a slow compressional wave in the formations;
   measuring the velocity of the slow compressional wave that has passed through the formations; and
   determining said product of porosity and formation factor from said measured velocity, said product of porosity and formation factor being determined as proportional to the inverse square of said measured velocity.

4. Apparatus for determining the porosity of subsurface formations surrounding a borehole, comprising:
   means for establishing a slow compressional wave in the formations;
   means for measuring the velocity of the slow compressional wave that has passed through the formations; and
   means for determining the porosity of said formations from said measured velocity, said porosity being determined as proportional to the square of said measured velocity.

5. Apparatus for determining the formation factor of subsurface formations surrounding a borehole, comprising:
   means for deriving a measure of the porosity of the formations;
   means for establishing a slow compressional wave in the formations;
   means for measuring the velocity of the slow compressional wave that has passed through the formations; and
   means for determining the formation factor of said formations from said velocity and said porosity, said formation factor being determined as proportional to the inverse of the product of said orosity and the square of said measured velocity.

6. Apparatus for determining the product of porosity and formation factor of subsurface formations surrounding a borehole, comprising:
   means for establishing a slow compressional wave in the formations;
   means for measuring the velocity of the slow compressional wave that has passed through the formations; and
   means for determining said product of porosity and formation factor from said measured velocity, said product of porosity and formation factor being determined as proportional to the inverse square of said measured velocity.

* * * * *